US011729484B2

(12) United States Patent
Franke et al.

(10) Patent No.: US 11,729,484 B2
(45) Date of Patent: *Aug. 15, 2023

(54) LENS MAIN BODY FOR A LENS, OUTER HOUSING FOR A LENS, LENS SYSTEM AND LENS ASSEMBLY

(71) Applicant: Carl Zeiss AG, Oberkochen (DE)

(72) Inventors: Jochen Franke, Heubach-Lautern (DE); Christophe Casenave, Aalen (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/866,584

(22) Filed: Jul. 18, 2022

(65) Prior Publication Data
US 2022/0353392 A1 Nov. 3, 2022

Related U.S. Application Data

(63) Continuation of application No. 16/517,596, filed on Jul. 20, 2019, now Pat. No. 11,425,290.

(30) Foreign Application Priority Data

Jul. 20, 2018 (DE) .................. 10 2018 212 119.2

(51) Int. Cl.
H04N 23/55 (2023.01)
H04N 23/663 (2023.01)
(Continued)

(52) U.S. Cl.
CPC .......... H04N 23/55 (2023.01); H04N 23/663 (2023.01); H04N 23/665 (2023.01); H04N 23/959 (2023.01)

(58) Field of Classification Search
CPC ............ H04N 5/2254; H04N 5/23209; H04N 5/232125; H04N 5/23227; H04N 5/2253;
(Continued)

(56) References Cited

U.S. PATENT DOCUMENTS 8,814,448 B2 8/2014 Otani et al.
9,442,270 B2 9/2016 Araki et al.
(Continued)

FOREIGN PATENT DOCUMENTS

CN 1485671 A 3/2004
DE 102006019449 A1 10/2007
(Continued)

OTHER PUBLICATIONS

Office Action dated Mar. 22, 2023 issued in Japanese counterpart application No. 2019-112160 and English-language translation thereof.

Primary Examiner — Abdelaaziz Tissire
(74) Attorney, Agent, or Firm — Ewers IP Law PLLC; Falk Ewers

(57) ABSTRACT

A lens main body includes an inner housing, a lens element mounted on the inner housing, an adjustable functional element mounted on the inner housing, and an electrical drive arranged on the inner housing to adjust the functional element, a controller arranged on the inner housing, a securing device configured to reversibly receive an outer housing extending around the inner housing in a tubular fashion, and a first signal interface to receive control signals for the controller, arranged on the inner housing, and configured to reversibly couple to a mating interface of the outer housing. An outer housing for the lens main body, and a lens formed from the lens main body and the outer housing have an altered functional scope vis-à-vis the lens main body. In addition, a lens assembly includes, besides the lens main body, two outer housings having a different functional scope.

20 Claims, 7 Drawing Sheets

(51) Int. Cl.
*H04N 23/60* (2023.01)
*H04N 23/959* (2023.01)

(58) Field of Classification Search
CPC .. H04N 5/23203; H04N 23/55; H04N 23/663; H04N 23/665; H04N 23/959; H04N 23/66; H04N 23/54; G03B 17/14; G03B 9/02; G02B 7/08; G02B 7/14
See application file for complete search history.

(56) References Cited

U.S. PATENT DOCUMENTS

| | | | | |
|---|---|---|---|---|
| 11,175,567 | B2* | 11/2021 | Franke | G02B 7/09 |
| 11,425,290 | B2* | 8/2022 | Franke | H04N 5/23227 |
| 2004/0130646 | A1* | 7/2004 | Terada | H04N 5/23212 |
| | | | | 348/335 |
| 2006/0268158 | A1* | 11/2006 | Ishiyama | H04N 5/23203 |
| | | | | 348/E5.091 |
| 2009/0059401 | A1* | 3/2009 | Yamazaki | G02B 7/102 |
| | | | | 359/826 |
| 2011/0019367 | A1 | 1/2011 | Hatch | |
| 2014/0132781 | A1* | 5/2014 | Adams | H04N 5/23206 |
| | | | | 348/207.1 |
| 2014/0140687 | A1 | 5/2014 | Otani et al. | |
| 2015/0326788 | A1* | 11/2015 | Tsuge | H04N 5/23293 |
| | | | | 348/211.1 |
| 2017/0099428 | A1* | 4/2017 | Okuyama | H04N 5/23296 |
| 2017/0163858 | A1 | 6/2017 | Shiraishi | |
| 2018/0307004 | A1* | 10/2018 | Nagaoka | G02B 7/021 |

FOREIGN PATENT DOCUMENTS

| | | | |
|---|---|---|---|
| DE | 102015110177 A1 | * | 12/2016 |
| JP | 2003172863 A | | 6/2003 |
| JP | 2006098518 A | | 4/2006 |
| JP | 2007298672 A | | 11/2007 |
| JP | 2013080001 A | | 5/2013 |
| JP | 2014075641 A | | 4/2014 |
| WO | 2013018453 A1 | | 2/2013 |

* cited by examiner

LENS MAIN BODY FOR A LENS, OUTER HOUSING FOR A LENS, LENS SYSTEM AND LENS ASSEMBLY

CROSS REFERENCE TO RELATED APPLICATIONS

This application is a continuation application of U.S. patent application Ser. No. 16/517,596 filed on Jul. 20, 2019, claiming priority from German application 10 2018 212 119.2, filed Jul. 20, 2018, and the entire content of these applications is incorporated herein by reference.

TECHNICAL FIELD

The disclosure relates to a lens main body for a lens. Furthermore, the disclosure relates to an outer housing for a lens, in particular a lens including such a lens main body. In addition, the disclosure relates to a lens formed by the lens main body and the outer housing, and to a lens assembly.

BACKGROUND

A lens is usually understood to mean a set (i.e., a group) of optical lens elements which are arranged successively along an optical axis (i.e., along a direction of propagation of an incident light ray) to image an object onto an optically sensitive surface. In modern cameras, the optically sensitive surface is normally a "detector chip" for example a charge-coupled device (CCD) sensor, a complementary metal-oxide-semiconductor (CMOS) sensor or the like. In order to permit sharp imaging of the object onto the optically sensitive surface, even when the distance to the lens varies, one of the lens elements (also referred to as the "focus lens element") is typically mounted so that it can be moved along the optical axis for so-called focusing. In order to be able to change the focal length of the entire lens, for example, at least one other lens element (also referred to as "zoom lens element") can often be arranged so that it can be moved. Furthermore, lenses usually also include a diaphragm, by which the diameter of the diaphragm opening (also referred to as the aperture), i.e., the diameter of the beam path through the lens, can be altered in order to be able to regulate the amount of light impinging on the image plane. Optionally, an iris diaphragm may additionally be provided as well. An adjustment of the respective lens element and optionally also of the diaphragm is often carried out here by way of so-called rotary rings (also referred to as "handwheels" or "actuating rings") on a housing carrying the lens elements. In this case, said rotary rings transform a rotary movement into a longitudinal movement of the respective lens element by way of a link guide or curved guide. In modern lenses, some of the moveable components described above (in particular the focus lens element and the diaphragm) are typically (also) adjustable by an electric motor.

Particularly in the case of cameras for film recordings, referred to hereinafter as "film cameras" for short, it is known to mount these cameras on a stand in order for example to enable particularly steady (i.e., blur-free) film recordings and/or to be able to bring the film camera for example on a cranelike carrier to a viewing angle which is virtually impossible to achieve, or is achievable only with considerable outlay, with manual operation of the respective film camera. In the latter case, in particular, adjusting the focus and/or the magnification (i.e., the focal length) requires the use of external, often remotely controlled (wired or radio-based) drives (in particular an electric motor with a gear mechanism connected downstream) that engage on the exterior of the respective rotary rings of the lens. Depending on the complexity of the lens used and/or the settings to be carried out, this gives rise in part to particularly voluminous structures which exceed by a multiple the structural space occupied by the camera itself and the assigned lens. Furthermore, recently use has often been made of (flying) drones, too, which can manipulate the respective camera particularly flexibly in relation to the objects (articles) to be recorded. In such a case, however, it is recognized that a structure of the type described above is usually a hindrance since the respective drone may be unable to carry the weight of the entire structure.

SUMMARY

It is an object of the disclosure to enable a lens for a camera with a particularly wide range of deployment.

The object is achieved by a lens main body for a lens, an outer housing, a lens, and a lens assembly as described herein.

The lens main body according to an aspect of the disclosure forms a part of a lens which serves for use with a camera, in particular a film camera. The lens main body includes an inner housing and typically also at least one lens element mounted on the inner housing. Furthermore, the lens main body includes at least one adjustable functional element arranged on the inner housing. The lens main body also includes a controller arranged on the inner housing. Furthermore, the lens main body includes a securing device configured to reversibly receive an outer housing extending around the inner housing (in the intended final mounting state) in a tubular fashion. Moreover, the lens main body includes a first signal interface for receiving and/or transmitting signals (e.g., control signals) for or from the controller, said first signal interface being arranged on the inner housing. In this case, said first signal interface is configured to reversibly couple to a mating interface of the outer housing (i.e., a mating interface arranged on the outer housing). The controller additionally has a first number of functions, which are typically selectable and/or retrievable via the first signal interface (and thus by the mating interface arranged on the outer housing).

The term "adjustable functional element" is understood to mean, in particular, an element which, depending on its actuating position, has a varying influence on the light (beam) that has passed through an entrance pupil of the lens main body and optionally also through the at least one lens element. Such an adjustable functional element thus typically serves for the targeted variation of the image projected by the lens formed with the lens main body.

The terms "reversibly receiving" or "reversibly coupling" are understood to mean that the securing device and the first signal interface, respectively, are embodied in such a way that the connection to the outer housing and to the mating interface, respectively, can be made and also released again particularly simply and expediently by a user of the lens main body (and thus also of the lens including the lens main body)—i.e., not by trained specialist personnel of the (lens) manufacturer, for example. In other words, the securing device and the first signal interface are configured for simple and repeated connection to the outer housing and the mating interface thereof, respectively. As a result, the securing device and the first signal interface are differentiated from connection means which can indeed be released, in principle, but are subject to a high risk of damage to signal lines and the like in the absence of technically provisioned action.

The term "extending around in a tubular fashion" is understood to mean that in the intended mounting state the outer housing at least partly encloses the inner housing along the longitudinal extent thereof running in the direction of an optical axis of the lens element or all the lens elements. Expediently, at least the beam path extending along the optical axis of the lens element or the optional plurality of lens elements is free (i.e., not delimited by the outer housing). In particular, the outer housing is thus differentiated from an additional housing that is attachable to the inner housing in particular only laterally and/or (in particular as viewed in the circumferential direction around the optical axis) regionally. Typically, in this case the outer housing is embodied in a circular-cylindrical fashion at least in sections. Expediently, the outer housing specifically forms a kind of "cover" for the inner housing, by which typically the components (i.e., the or the respective drive, the controller, and the signal interface, etc.) arranged (in particular on the exterior) on the inner housing are protected against mechanical influence and/or other environmental influences (e.g., contamination).

The term "function" is understood to mean both a selectable, actual activity of the (in particular entire) lens—e.g., an adjustment of the respective functional element—and an information or data exchange directed, e.g., to optical data that are characteristic of the lens. In particular, however, in both cases signals are exchanged between the controller and the outer housing. A function of the lens is thus formed both by an effect on the recorded image (in particular on account of the adjustment of the functional element) and by a data exchange.

The controller, which can also be referred to as control unit, is embodied for example as a non-programmable electronic circuit. Alternatively, the controller is formed by a microcontroller having a processor and a data memory on which the functionality for selecting the respective function is implemented by software.

In principle, the first signal interface can be configured only for unidirectional communication (that is to say for transmitting or receiving signals). Typically, however, the first signal interface (and correspondingly also the mating interface) is configured for bidirectional communication, i.e., for receiving and for transmitting signals, that is to say for exchanging signals.

By virtue of the fact that the inner housing of the lens main body includes the securing device for reversibly receiving the outer housing, and also the first signal interface configured for reversibly coupling to the mating interface, this enables the outer housing to be changed particularly simply. Furthermore, this advantageously also makes it possible that different outer housings which select and/or retrieve in each case different groups (numbers or combinations) of the functions provided by the controller can optionally be mounted on the inner housing. Consequently, the respective mounted outer housing or outer housing to be mounted is optionally chosen from a plurality of outer housings each having a different functional scope. Correspondingly, in particular, the lens main body is also configured for exchanging different outer housings (typically having a different functional scope). As a result, in particular for different applications, a respectively "matching" (overall) lens (also referred to as lens system) can be assembled in a simple manner. Lenses which are respectively adapted to a specific application at the factory and have a housing fixedly assigned by the manufacturer—e.g., particularly lightweight lenses, which thus require a comparatively high cost investment on the part of the user who would like to be able to cover a plurality of applications, can thus be obviated.

In one exemplary embodiment, the lens main body includes at least one (and optionally electrical) drive arranged on the inner housing and serving for adjusting the functional element or at least one of the optional plurality of adjustable functional elements. Typically, in the case of a plurality of adjustable functional elements, each of these adjustable functional elements is respectively assigned an in particular electrical drive. In particular in the case of the electrical drive (e.g., a stepper motor, a bow drive, a micro drive, an ultrasonic motor, a piezomotor, or the like), the controller described above is typically configured and provided at least for controlling the or the respective electrical drive.

In a further exemplary embodiment, the functional element is formed by an element selected from the group of in particular adjustable lens elements, diaphragms, (in particular optical) filters, and/or optical freeform elements. An optical freeform element is understood to mean, in particular, not only lens elements having a freeform surface but also, e.g., a mirror or a combination of a mirror and a lens element. Optionally, a plurality of adjustable functional elements are present, which are formed by different elements from the above group.

Typically for the case where the adjustable functional element or one of the optional plurality of adjustable functional elements is formed by at least one lens element, the latter is embodied such that it is adjustable in particular axially, i.e., along the optical axis (typically also reversibly). In this case, the (in particular electrical) drive (or one of the optional plurality of drives) serves for axially adjusting the lens element or at least one of the optional plurality of axially adjustable lens elements and is designated here specifically as "lens element drive". Typically, in the case of a plurality of axially adjustable lens elements, typically each of these axially adjustable lens elements is respectively assigned an electrical lens element drive.

Optionally, the adjustable functional element, in particular the adjustable lens element, or one of the optional plurality of adjustable functional elements is adjustable transversely or rotationally with respect to the optical axis, in particular in order to enable an image stabilization during intended operation. In this case, the assigned drive is expediently embodied in an electrical fashion.

Typically, as an alternative or in addition to the adjustable lens element, as an (optionally further) adjustable functional element, the lens main body also includes the diaphragm mentioned above, which is typically embodied such that it is electrically ("automatically") adjustable and which serves for altering the diameter of the diaphragm opening, also designated as aperture. Expediently, the lens main body also includes an assigned drive for adjusting the diaphragm, which drive in this case is also designated as "diaphragm drive".

The abovementioned filter which alternatively or optionally additionally forms the functional element or optionally one of the functional elements is optionally a filter "introducible" into the beam path to different extents (e.g., a "neutral density filter", for short: ND filter), an optical soft-focus lens element, or the like.

Typically, the lens main body includes a plurality of lens elements, at least one of which also is mounted on the inner housing in a stationary fashion.

In one exemplary embodiment, the inner housing of the lens main body is embodied in such a way that it encapsulates the respective adjustable functional element, that is to say, e.g., the lens element or the respective lens element, and typically also other functional elements optionally present, in particular against contamination, i.e., typically against dust, optionally also against moisture (in particular air humidity). This makes it possible in combination with the simple exchangeability of the outer housing, during mounting or changing of the outer housing, to reduce the risk of contaminants, in particular dust, penetrating into the beam path within the lens main body, i.e., within the inner housing and/or between the optional plurality of lens elements. That is to say that during mounting and/or changing of the outer housing, there is no need to satisfy "clean room conditions" or at least conditions with reduced occurrence of dust. In particular, such changing and/or such mounting can be carried out in a typically dry area with normal atmosphere (on a film set for example in a tent, a car, or an at least wind-protected area).

In one exemplary embodiment, the securing device includes a holding mechanism configured and provided for the toolless mounting of the respective outer housing. By way of example, the securing device in this case includes a part of a bayonet catch—wherein the respective outer housing bears the corresponding counterpart, a detent pawl (or: catch hook) mechanism, wherein the outer housing is pushed onto the inner housing and clipped (or "hooked") with the detent pawl or the catch hook. The corresponding counterpart, i.e., the detent pawl or the catch hook itself, or a corresponding cutout or a projection, into or behind which the detent pawl or the catch hook engages as intended, is typically arranged on the outer housing in this case. Alternatively, the holding mechanism is formed for example by a mounting thread arranged on the inner housing and extending around the optical axis, in particular, with an assigned mounting ring—i.e., a type of nut. In this case, for mounting purposes, the outer housing is pushed onto the inner housing, typically as far as a stop, and is subsequently clamped ("tightened") against the stop with the mounting ring placed onto the mounting thread. The simple mountability of the outer housing is promoted further by such a toolless holding mechanism.

In one exemplary embodiment, the holding mechanism—in particular in the case of the bayonet catch or the detent pawl (or: catch hook) mechanism, has a bar, knob or the like that can be used to unlock the bayonet catch or the detent pawl or the catch hook for the purpose of demounting. In this case, said bar or knob is arranged on the inner housing or alternatively on the outer housing.

In one optional, alternative exemplary embodiment, the securing device includes a plurality of screw joints that can be used to secure the outer housing to the inner housing by a respective screw (and thus using a tool). Typically, the number of securing screws is reduced here by comparison with a conventional lens (e.g., to 2 or 3 to 5 screws), such that sufficiently simple mounting is still possible. Typically, said securing screws are arranged in an easily accessible manner even for untrained personnel.

In a further exemplary embodiment, the securing device includes a positioning aid for the rotational orientation of the outer housing relative to the inner housing (i.e., for predefining the rotary position of the outer housing about the optical axis). In this case, the positioning aid is one or a plurality of guide rails, for example, which cooperate with a complementarily embodied counterpart arranged on the outer housing. The guide rail is in turn a guide groove, for example, into which a web or pin arranged on the outer housing engages as complementary counterpart. Alternatively, the guide rail is a web (in particular a strip typically extended longitudinally with respect to the optical axis and projecting radially) which cooperates as intended with a corresponding groove or depression in the outer housing during mounting. During the mounting of the outer housing on the inner housing, this makes it possible in a simple manner that the securing device and/or the first signal interface can be brought respectively for coupling with the corresponding mating interface without additional mounting outlay (in particular without further assistance on the part of the user).

In one exemplary embodiment, the positioning aid is typically configured to predefine a mounting of the outer housing (on the inner housing) in a first or at least one second predefined orientation with respect to the inner housing. In other words, the positioning aid (optionally in cooperation with the corresponding counterpart of the outer housing) predefines at least two orientations or positionings of the outer housing around the optical axis of the inner housing. This is expedient particularly for the case where in some cases of use of the lens mounted on a camera, there is a lack of readability of scales (i.e., inscriptions) or optionally of a display arranged on the outer housing for example on account of attachment parts or carrier systems for the camera. In this case, the outer housing can advantageously be mounted on the inner housing in at least one second orientation turned rotationally relative to the first predefined orientation. Typically, the first and the at least second predefined orientation are offset with respect to one another by 45° to 135°, in particular by about (i.e., exactly or approximately) 90°.

For the case where, as described above, the positioning aid makes possible at least two orientations of the outer housing on the inner housing which are turned rotationally relative to one another, in one particularly exemplary embodiment, the inner housing has at least one second signal interface assigned to the second orientation. This is expedient in particular for the case where the (first) signal interface and the corresponding mating interface are electrical contacts. In this case, therefore, during appropriately turned mounting of the outer housing on the inner housing, the mating interface can be brought into electrical contact with the second signal interface. In the mounting case where the outer housing is arranged on the inner housing in the second predefined orientation, the mating interface is thus coupled to the second signal interface. In one alternative exemplary embodiment that is likewise conceivable within the scope of the disclosure, the inner housing has only the first signal interface and the outer housing includes a second mating interface assigned correspondingly to the second orientation, said second mating interface being coupled to the first signal interface of the inner housing during turned arrangement of an outer housing.

In an alternative exemplary embodiment of the second signal interface described above, the first signal interface is expediently embodied as a continuously variable interface. By said continuously variable interface, the mating interface of the outer housing is couplable in this case in particular in an arbitrary rotational orientation of the outer housing relative to the inner housing. By way of example, the first signal interface is formed in this case by at least one sliding contact or slipring, in particular a plurality of sliding contacts or sliprings arranged alongside one another. In this case, the mating interface is formed in particular by at least one corresponding mating contact typically embodied in the manner of a brush, in particular by a number of mating contacts corresponding to the number of sliding contacts or sliprings. Likewise within the scope of the disclosure, in an alternative exemplary embodiment, the first signal interface is embodied in a brush-like fashion and the mating interface is embodied in the manner of sliding contacts or sliprings. As a result, the positioning aid can optionally be obviated since an intended contacting between the first signal interface and the mating interface is advantageously made possible in all rotational positions (at least in the length of the sliprings).

In one exemplary embodiment, the controller is configured to output a position variable that is characteristic of an actuating position of the or the respective functional element, e.g., of the or the respective lens element along the optical axis and/or the diaphragm (i.e., the opening diameter thereof), and to transmit said position variable to the mating interface in particular by the first and/or the optionally present second signal interface, as a function. For the case where the functional element is an adjustable lens element, specifically a focus lens element, the position variable in this case typically reflects the focus position. For the case where the adjustable lens element is a "zoom lens element" (i.e., a lens element for varying the focal length), the assigned position variable reflects in particular a currently set zoom value, a focal length, or the like. For the case where the position variable is assigned to the currently set diaphragm opening, the position variable reflects in particular a so-called "f-number" (which is in turn linked to the focal length of the overall optical system). For the case where the functional element is an ND filter, the position variable indicates to what extent the ND filter projects into the beam path. The term "characteristic" is thus understood here and hereinafter in particular to the effect that the position variable includes quantitative information about the actuating position of the functional element, e.g., of the respective lens element along the optical axis and/or the diaphragm, such that the actuating position, e.g., the optical setting resulting therefrom, can be read unambiguously from this variable. In this case, the position variable can directly indicate the actuating position of the functional element, that is to say, e.g., the actuating position of the respective lens element—in particular the distance from an image plane—or the diameter of the diaphragm opening. Alternatively, however, the position variable is a variable which is directly or indirectly proportional to the actuating position (e.g., the distance between the lens element and the image plane) or is in a non-linear, for example a logarithmic, exponential, or polynomial (that is to say quadratic, cubic, etc.), relationship with said actuating position. By way of example, the position variable is specifically the focal length or "distance setting" resulting from the actuating position of the respective lens element. Further examples of information conveyed by the position variable are a so-called "hyperfocal distance", a horizontal field of view in degrees, position of the entrance pupil, near and far field and the like.

In order to detect the actuating position of the respective functional element, e.g., of the respective lens element or the diaphragm, in one exemplary development, the lens typically includes a position encoder—e.g., a displacement sensor (typically effecting absolute measurement)—which outputs (in particular to the controller) a measurement signal corresponding to the actuating position. Alternatively, the controller is configured to calculate the current actuating position from a motor characteristic variable (e.g., a number of revolutions) of the respective drive for the respective functional element.

In one exemplary embodiment, the controller is configured to transmit identification data to the mating interface and/or to receive identification data from said mating interface, in particular by the first and/or the optionally present second signal interface, as (optionally further) function. The identification data are typically data which make possible an unambiguous identification of at least the type of the lens main body and/or of the outer housing. In this case, the identification data includes, for example, a serial number of the lens main body and/or of the outer housing. Furthermore, in particular identification data transmitted by the lens main body, i.e., by the controller, includes information about the focal length (in particular the available focal length range), about the available diaphragm diameters (f-numbers) and/or optionally about a calibration of the lens element system. Such calibration information items (or "data") contain for example information concerning the relationship between the purely mechanical actuating travel (i.e., the sequence of the individual actuating positions) and the variation of the focal length and/or of the focus position that actually results therefrom. In this case, said relationship is usually individually different for each lens main body, specifically for each lens element system. As a result, it is possible (in particular on the part of the outer housing) to carry out a coordination (or a referencing) of actuating commands, transmitted to the controller from the outer housing, to the calibration of the drives of the lens elements. In the context of such a coordination, optionally the entire actuating travel of the lens elements is gone through (referred to as "calibration pass") and the respective end positions (actuating positions at the respective end of the actuating travel) are communicated to the outer housing, such that the actual actuating position of the respective lens element is known for each actuating position predefined by the outer housing in the context of the actuating command. Particularly typically, the respective functional element, in particular position sensor assigned to the or the respective adjustable lens element, is a sensor effecting absolute measurement, which sensor can thus output information about the current actuating position of the functional element or of the respective lens element at any point in time. In this case, said current actuating position is also communicated to the outer housing. A calibration pass can be omitted in this case. Moreover, the identification data transmitted on the part of the outer housing or the mating interface are, in particular, information about the functions encompassed by the outer housing. This is expedient in particular since in this regard, for example, some functions can be switched off on the part of the lens main body or the controller in order to reduce the energy consumption.

In one exemplary embodiment, the lens main body, typically the controller, includes an identification device configured to evaluate the identification data transmitted by the outer housing and thus to identify the optionally mounted outer housing and in particular also the functional scope thereof. As already described, the identified functional scope is utilized on the part of the controller in order to switch off (to deactivate) functions not encompassed by the outer housing. Typically, the or the respective outer housing also includes a corresponding identification device in order to be able to unambiguously identify the lens main body (currently) accommodated in the outer housing.

In one alternative exemplary embodiment, the calibration data described above are transmitted (and the calibration pass described above is typically carried out) independently of the identification data described above in particular in the context of a (typically separate, e.g., user-initiated) calibration (or else: "referencing") of the currently mounted outer housing.

In a further exemplary embodiment, the controller is configured to output actuating-position-related lens element data and typically to transmit the data to the mating interface via the first and/or the optionally present second signal interface, as (typically additional) function. Said actuating-position-related lens element data are typically information concerning optical aberrations that are regularly virtually unavoidable in optical systems, such as, e.g., vignetting, distortion, chromatic aberration, and the like. In this case, these aberrations are regularly dependent on the actuating position of the or the respective lens element and thus vary during an adjustment of the or the respective lens element.

In one exemplary embodiment, the first and also the optionally present second signal interface (in particular optionally all further signal interfaces) include electrical contacts. In this case, the electrical contacts are advantageously a robust and easily implemented type of contact suitable for reversible contacting. By way of example, the contacts are embodied as spring contacts or plug contacts which cooperate with a respectively corresponding mating contact (in particular a spring contact or a male or female plug contact) assigned to the mating interface. Alternatively, it is also possible to use so-called contact blades (also referred to as "blade contacts") which intermesh with their counterparts in a comblike fashion.

In an alternative exemplary embodiment, the first and the optionally present second signal interface—and correspondingly also the mating interface—are embodied as a wireless interface. By way of example, the respective signal interface includes an optical transmitting and/or receiving element configured for cooperating with a correspondingly configured element of the outer housing. By way of example, in this case, data transmission is effected in the infrared range. Alternatively, the data transmission is effected by inductive transmission techniques or transmission techniques established in the field of radio-frequency engineering (for example "near field communication"). Particularly in the latter case, the second signal interface on the inner housing can be obviated since there is no need for direct contact or direct juxtaposition of the respective signal interface and the mating interface.

In a further exemplary embodiment, the first and the optionally present second signal interface are configured for the energy supply of the outer housing, in particular of the electronic components arranged on the outer housing. In this case, the energy transfer from the first and/or the second signal interface to the mating interface is typically effected in addition to and independently of the (data) signal exchange between the or the respective signal interface and the mating interface. Particularly for the case where the first and optionally the second signal interface are embodied for wireless communication, an additional (electrical) energy supply interface is arranged on the inner housing (and expediently also on the outer housing). Alternatively, the energy supply of the outer housing can also be effected by inductive energy transfer from the inner housing to the outer housing.

In a further exemplary embodiment, the lens main body includes, in addition to the first and the optionally present second signal interface, a radio receiver configured to receive remote control commands wirelessly transmitted in particular separately from the outer housing (i.e., from a separate external apparatus). In this case, said radio receiver is typically arranged on the inner housing. The radio receiver is additionally configured for transmitting (i.e. forwarding) the remote control commands to the controller and is optionally integrated into the latter. Optionally, the radio receiver together with a transmitter forms a radio module configured for bidirectional radio operation (i.e. also for the wireless transmission of signals, in particular data from the controller to the external apparatus). The lens main body is thus configured—even without a mounted outer housing—for remote control operation. In this case, it is possible to use a particularly lightweight outer housing, constituting in particular only an outer enclosure without electrical functions. This is in turn particularly expedient for example for operating the camera and the lens on a drone. In this case, the possibility for remote operator control by radio constitutes in particular a further function of the lens.

In a further exemplary embodiment, the controller is typically configured to exchange dimensionless and/or dimensional information in particular optionally in different unit systems, typically in the metric or Anglo-American unit system. Optionally, the controller is also configured to output this information optionally in different languages. This—optionally additional—function is expedient in particular for the case where the outer housing has a display for displaying the corresponding information. In this case, the information is, in particular, the abovementioned position variable of the functional element, i.e., of the or the respective lens element, which in this case is optionally output in meters or in feet, or of the diaphragm. Typically, in this case, the controller is additionally configured to carry out the conversion between metric and Anglo-American unit systems automatically, in particular, on the basis of the exchanged identification data. By way of example, in this case, the identification data optionally transmitted by the outer housing contain information about the unit system used by the outer housing. A conversion between the two unit systems is thus typically effected on the part of the lens main body, specifically the controller. Consequently, without additional outlay, the lens main body can also be used with different outer housings "working" in particular on the basis of different unit systems. By way of example, it is conceivable that an outer housing that uses the Anglo-American unit system is offered only on the North American market but a purchaser of this outer housing would also like to use it with a lens main body procured in Europe, for example. In particular, a factory-implemented invariable predefinition and tuning of the lens main body, specifically of the controller, to one of the unit systems can thus also be obviated, with the result that manufacturing outlay for different international markets can be obviated. In this case, the language in which the information mentioned above is output is typically selectable (e.g., pre-settable in so-called basic settings) in the context of a kind of "operating language" of the lens main body, in particular of the lens formed therewith, by a user.

In one exemplary embodiment, the lens main body includes a camera interface arranged in particular on the inner housing and serving in particular for communication with a camera on which the lens is mounted in the intended operating state. In this case, said camera interface is configured and provided in particular for exchanging information and for exchanging control commands (for example for adjusting a focus lens element, i.e., for focusing, and/or for adjusting the diaphragm). Said camera interface is alternatively or typically additionally also configured for receiving operating energy in particular for the (typically electrical) drive of the respective functional element, e.g., of the lens elements (for short: lens element drives), the optionally present position encoder and/or the controller, and typically also for the outer housing.

Typically, the lens main body also includes a connection device (also called: "coupling device" or "coupling"), e.g., a part of a bayonet catch, for reversible, mechanical connection to a camera.

In a further exemplary embodiment, the lens main body includes an energy supply connection arranged in particular on the inner housing and configured for receiving (operating) energy for the respective (typically electrical) drive of the functional element (e.g., the lens element drives, the diaphragm drive, or the like) and/or for the controller from an external—i.e., in particular separate from a camera—energy supply unit. This is expedient in particular for the case where the camera to be connected to the lens does not have an interface for the energy supply of the lens or the power of the camera is insufficient.

Typically, the lens main body also includes a communication connection (also called: data interface) for communication (also called: data exchange) with an external apparatus. Optionally, in this case, said communication connection is integrated into the energy supply connection, such that from an external control apparatus, for example, both energy and control commands (and also further data) can be transmitted via this common connection.

The disclosure also relates to the outer housing for the lens main body described above. In this case, in the state mounted on the lens main body, the outer housing together with the latter forms a lens. In this case, the outer housing includes securing means configured for reversible securing to the inner housing of the lens main body, in particular for cooperation with the securing device of the inner housing. The securing means are thus specifically the complementary counterparts of the holding mechanism described above, in particular of the bayonet catch, of the detent pawl or catch hook mechanism or the like.

Typically, the outer housing also includes the above-described mating interface (optionally also two mating interfaces) configured and provided for reversible (signal-transmission-technological and optionally energy-transmission-technological) coupling to the first or optionally present second signal interface.

With further preference, the outer housing includes an operator control element for inputting the actuating command for the respective functional element.

In one exemplary embodiment, the outer housing includes, as such an operator control element, at least one rotary ring configured and provided for adjusting the functional element or at least one of the optional plurality of functional elements (e.g., for axially adjusting the lens element or one of the optional plurality of lens elements and/or for adjusting the optionally present diaphragm). In this case, the rotary ring is typically coupled to a rotary position encoder, for example an absolute value encoder, wherein said rotary position encoder is configured for generating the actuating command for the controller arranged on the inner housing of the lens main body. In this case, the rotary position encoder is typically in turn coupled to a microcontroller arranged on the outer housing, by which microcontroller the signal output by the rotary position encoder is conditioned (e.g., translated into the data transmission protocol of the controller of the lens main body) and output as an actuating command to the controller of the lens main body. For the longitudinal adjustment of the or the respective lens element, therefore, there is no mechanical force transmission between the rotary ring and the respective lens element. Rather, the turning carried out at the rotary ring is converted into an electrical actuating signal, in particular the actuating command mentioned above, and is communicated via the mating interface present in this case and also the first and/or second signal interface of the inner housing to the controller there. In this case, in one exemplary embodiment, the exterior of the rotary ring is embodied such that it is substantially smooth—i.e., without surface structures introduced from the standpoint of production engineering and standing out against the rest of the surface of the outer housing. Alternatively, a kind of grooving (e.g., a knurling or toothing) is applied on the outer side of the rotary ring and mediates a haptic effect known from conventional mechanical lenses. Optionally, an external actuating drive for adjusting the rotary ring and thus the respective functional element, e.g., the or the respective lens element, can also engage on such grooving.

In an exemplary embodiment of the rotary ring mentioned above, a touchscreen or at least one touch-sensitive surface, a rotary knob, slide or the like, by which the actuating command described above can be generated, is arranged on the outer side of the outer housing as operator control element for the functional element.

In a further exemplary embodiment, the outer housing includes at least one display configured in particular for displaying the information communicated by the controller. Said information is optionally so-called static information, e.g., the serial number of the lens main body, the diaphragm and focal length range and the like.

Typically, the information communicated by the controller and displayed by the display includes the position variable that is characteristic of the actuating position of the or the respective functional element, e.g., the or the respective lens element. This is expedient in particular since the outer housing is configured to be changeable with respect to the inner housing and, consequently, a calibration between the optionally present rotary ring, rotary knob or the like and the actual adjustment of the or the respective lens element is not maintained with sufficient certainty across a change of the outer housing. Optionally, the controller of the inner housing is configured (as described above) to carry out, after each mounting of an (in particular different) outer housing, a calibration, i.e., in particular a coordination or a referencing of the actuating commands communicated by the outer housing and the actual adjustment of the or the respective lens element. With a fixedly predefined scaling applied on the outer side of the outer housing, such a renewed calibration might not be taken into consideration.

According to an exemplary embodiment, the outer housing has no mechanical stops for the end positions of the respective rotary ring. In this case, a referencing (calibration) of the respective rotary position encoder is typically carried out by software and thus independently of the actual rotary position of said encoder. Consequently, a variable indication of the respective actuating position or the position variable or optionally a lens setting linked thereto by a display is particularly expedient.

In a further exemplary embodiment, the outer housing includes a receiving device for receiving remote control commands and also a communicating device for communicating the remote control commands to the mating interface and thus (in the intended mounting state) to the first and/or the second signal interface of the inner housing. In this case, the communicating device serves in particular for translating (i.e., transforming or converting) the received remote control commands to the data transmission protocol used by the controller of the lens main body. In this case, the receiving device is embodied as a radio receiver and/or as a wired interface for the connection of a cable for remote operator control—which optionally serves for connecting a radio module to the outer housing. In this exemplary embodiment, the outer housing typically does not include a rotary ring or other input device for manually inputting actuating commands. Typically, in this exemplary embodiment, the outer housing is moreover produced from a particularly lightweight material, for example a fiber-reinforced plastic, typically carbon-fiber-reinforced plastic. As a result, the use weight of the entire lens system is advantageously reduced and is thus particularly suitable for drone use. Furthermore, this exemplary embodiment is expedient in particular for the case where the lens main body does not itself already have the radio receiver described above. Optionally, the receiving device is part of a remote control interface (also referred to as radio module) configured for bidirectional communication, such that signals can also be transmitted, e.g., as a response to a received actuating command.

In a further exemplary embodiment, the outer housing includes a data interface for data exchange with an external apparatus. This involves a programming or service interface (e.g., a computer, tablet or smartphone, or a specifically designed programming apparatus) by which the controller of the lens main body can be accessed and/or which serves for transmitting for example the above-described position variable and/or aberration data to an image processing apparatus (e.g., the computer, the tablet, the smartphone or the like). Said data interface is optionally additionally also configured to form the above-described wired interface for connection to a radio receiver module for radio remote control of the lens. Furthermore, said data interface is also configured for transmitting energy to the outer housing or the overall lens.

In a further exemplary embodiment, the outer housing includes the above-described identification unit for identifying the currently mounted lens main body, specifically the identification data transmitted by the controller.

In an exemplary embodiment, the identification unit is configured to process, from a plurality of items of information provided on the part of the controller of the currently connected lens main body, only a number of items of information corresponding to a functional scope of the outer housing. Typically, the controller of the lens main body is configured to transmit in particular all items of information, specifically including those concerning all available functions. In this case, the identification unit "picks" out only the items of information which are assigned to the functions that are utilizable by the outer housing. This results in comparatively simple communication between the lens main body and the outer housing. In particular, a so-called handshake can be obviated.

In an exemplary embodiment, the outer housing includes mechanical securing means for external attachment parts, e.g., for at least one attachment lens element, a filter, a lens hood, a baffle or the like. Alternatively, the inner housing of the lens main body includes securing means of this type, such that the respective outer housing can be of particularly simple design.

In a further exemplary embodiment, the outer housing includes an integrated lighting system, e.g., a so-called macro ring light for the areal and uniform illumination of an object at a particularly small distance (e.g., less than 1 meter, in particular less than 50 centimeters) from the lens.

In one exemplary embodiment, the outer housing includes positioning means of the type described above which correspond to the positioning aid of the inner housing. That is to say that the outer housing includes for example at least one groove into which engages the positioning aid of the inner housing embodied as a guide web (or, mutatis mutandis, a web or projection which engages into a groove of the inner housing).

In a further exemplary embodiment, which also forms an independent disclosure, the outer housing includes a typically boxlike housing termination (in particular a housing chamber) which is shaped in particular on the image side relative to the or the respective lens element of the lens main body and in which an image sensor is arranged typically in an image plane of the lens (typically radially with respect to the optical axis). In this case, the lens main body accommodated in the outer housing forms together with the outer housing an (in particular autonomous) camera (also referred to as "camera module").

In one exemplary embodiment, the first and the optionally present second mating interface are configured for transmitting energy to the first and respectively second signal interface of the lens main body. This is expedient in particular for the case where the outer housing has the above-described data interface configured for receiving energy for the overall lens.

The (overall) lens according to an exemplary embodiment of the disclosure includes the lens main body described above and the outer housing of the type described above. The outer housing here (in particular in the intended mounting state) is connected or at least connectable reversibly to the inner housing of the lens main body. Typically, in the connected, intended mounting state of the lens, the optionally present mating interface of the outer housing is also coupled reversibly to the first or the optionally present second signal interface of the lens main body. The outer housing is furthermore configured for the utilization of a second number of functions altered vis-à-vis the first number of the functions provided by the controller. In particular, the lens includes, besides the lens main body described above, an outer housing having a reduced functional scope. In the latter case, at least a portion of the functions provided by the controller of the lens is typically "blocked" or not selectable or retrievable by the mounted outer housing.

The lens assembly according to an aspect of the disclosure includes the lens described above—i.e., the lens main body (including the inner housing carrying the or the respective lens element)—and a first and a second outer housing. In this case, the two outer housings are typically embodied in the manner described above and configured in each case for the utilization of a different number of the functions provided by the controller. In other words, the two outer housings are in each case outer housings "tailored" to a specific purpose of use and having a different number and/or combination of the features encompassed in the embodiments described above. By way of example, one of the two outer housings includes the rotary ring described above and is thus configured in particular for manual operator control of the lens. In this case, the other (second) outer housing includes only the receiving device for receiving the remote control commands and is thus "optimized" for example for operation on a drone.

The conjunction "and/or" should be understood here and hereinafter such that the features linked by this conjunction can be embodied both jointly and as alternatives to one another.

BRIEF DESCRIPTION OF THE DRAWINGS

The disclosure will now be described with reference to the drawings wherein.

DESCRIPTION OF EXEMPLARY EMBODIMENTS

Mutually corresponding parts are always provided with identical reference signs in all of the figures.

Figures 1, 2:
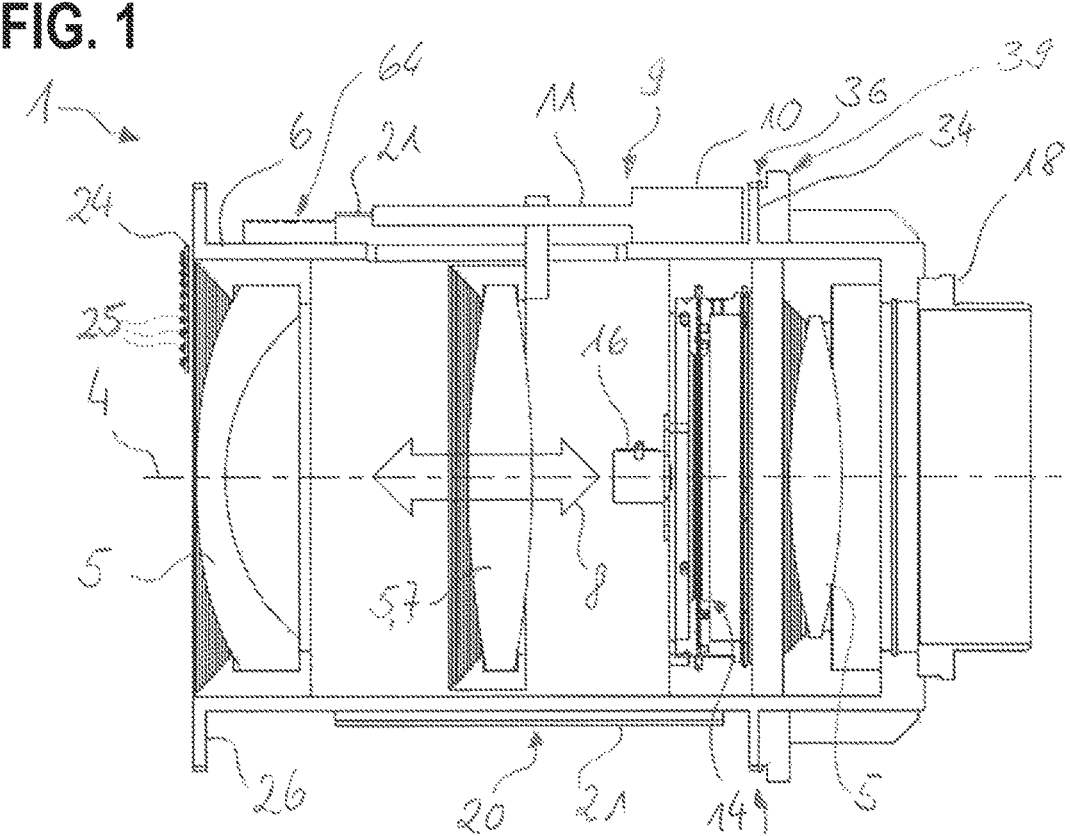
FIG. 1 schematically shows a lens main body for a lens in a sectional view along an optical axis.
FIGS. 2 and 3 show the lens main body in accordance with FIG. 1 in perspective views.
Figure 3:
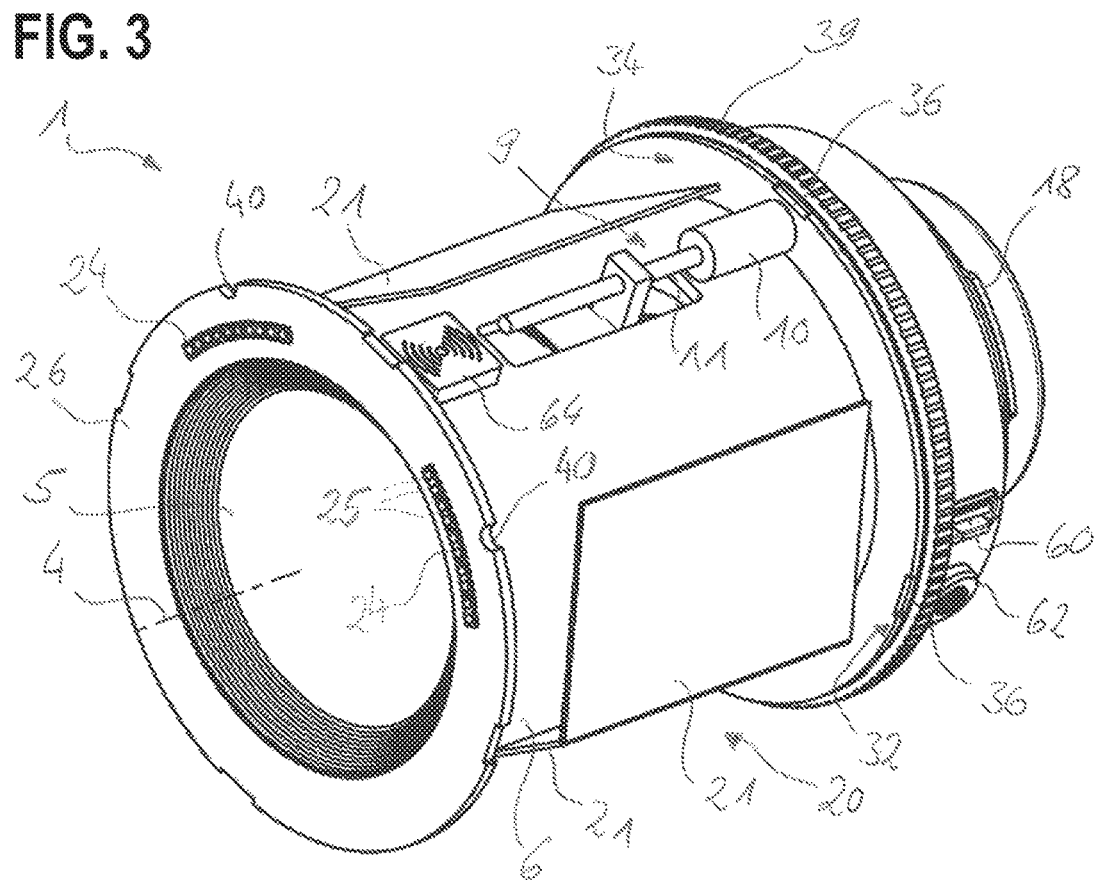
Figure 12:
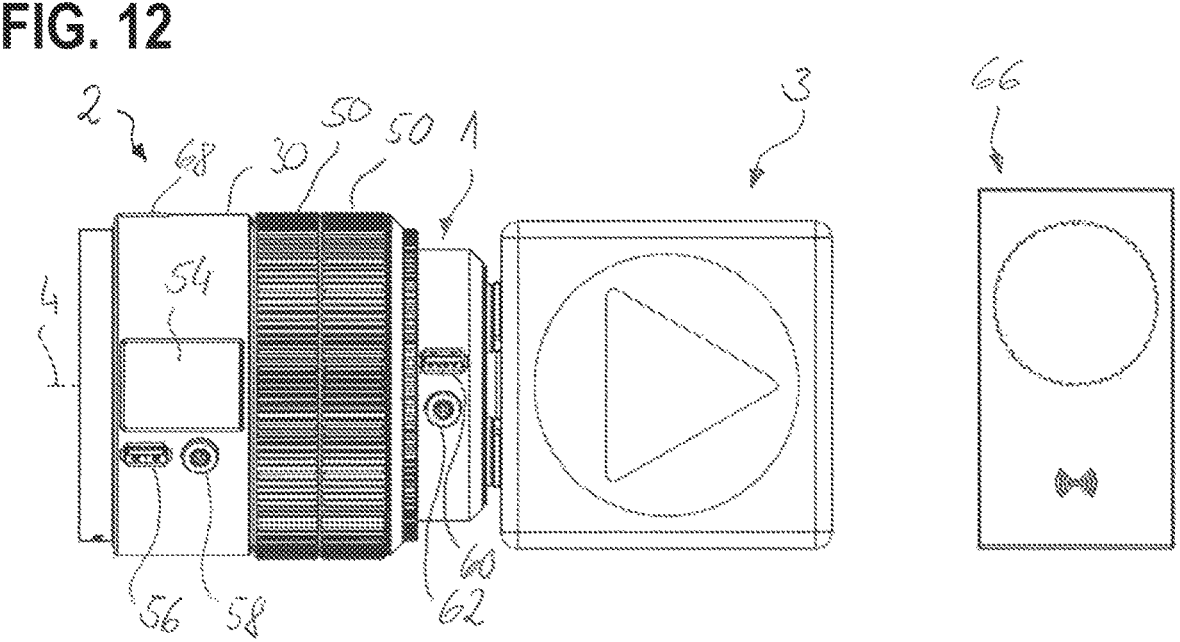
FIG. 12 shows, in a side view, a camera with the lens in accordance with FIG. 7 and a remote control.

FIGS. 1 to 3 illustrate a lens main body 1 which, in an intended use state, forms a part of a lens 2 (see FIG. 7) for a camera, specifically a film camera 3 (see, e.g., FIG. 12). In this case, the lens main body 1 is specifically part of a modular lens assembly described in greater detail below. In this case, the lens main body 1 includes a plurality of lens elements 5 arranged along an optical axis 4. The lens 1 additionally includes an inner housing 6, which holds the lens elements 5 with their respective lens element plane oriented radially with respect to the optical axis 4. In this case, two of the lens elements 5, namely a lens element 5 designated as "zoom lens element" (not illustrated in more specific detail) and a lens element 5 designated as "focus lens element" 7, are mounted on, specifically in, the inner housing 6 displaceably along the optical axis 4 (cf. double-headed arrow 8). The zoom lens element and the focus lens element 7 here form in each case an adjustable (optical) functional element.

For displacing the zoom lens element and the focus lens element 7, the lens main body 1 furthermore includes a respective assigned lens element drive 9 (only the lens element drive 9 for the focus lens element 7 is visible in each of FIGS. 1 to 3). In this case, the lens element drive 9 includes an electric motor 10 and a spindle drive 11, which converts the rotary movement of a shaft of the electric motor 10 into a linear movement along the optical axis 4. In this case, the lens element drive 9 is arranged on the exterior of the inner housing 6. During operation, the lens element drive 9 transmits an actuating force to the respective lens element 5, specifically to the focus lens element 7. The lens main body 1 thus does not have a manually actuatable drive (e.g., link guides mechanically coupled to rotary rings) for adjusting the respective lens element 5 (specifically the focus lens element 7).

In an exemplary embodiment that is not illustrated, the lens element drive 9 is arranged within the inner housing 6.

In order, during the operation of the lens 2, to be able to control the amount of light passing through the lens element system formed by the lens elements 5, the lens main body 1 also includes an adjustable diaphragm 14. By the latter, the opening diameter of an aperture or (passage) "pupil" defined by the diaphragm can be varied. The diaphragm 14 is adjusted by an electrical diaphragm drive 16. In this case, the diaphragm 14 likewise forms an adjustable functional element.

For the reversible coupling of the lens 2 to the film camera 3, the lens main body 1 includes a coupling device, designated as "coupling 18", which is arranged at the "image-side" end of the inner housing 6. Said coupling 18 constitutes one part of a bayonet catch, the other part of which is arranged on the film camera 3.

The lens main body 1 additionally includes a control unit designated as controller 20 (illustrated schematically by a plurality of printed circuit boards 21 arranged on the exterior of the inner housing 6). In this case, the controller 20 serves, inter alia, for driving the lens element drives 9 and the diaphragm drive 16. In addition, besides the adjustment of the lens elements 5, further functions of the lens 2 are provided by the controller 20 (described in greater detail below). In this case, the controller 20 can be addressed for initiating a specific function—that is to say specifically, e.g., for adjusting the focus lens element 7 or the zoom lens element or the diaphragm 14—by a control command (also called: actuating command). Furthermore, however, as functions, the controller 20 also provides respectively different items of information to an apparatus or module separate from the lens 2.

For receiving the control commands and/or for communicating the information, the lens main body 1 includes a signal interface 24 arranged on the inner housing 6 (see FIGS. 1 and 3). Said signal interface 24 is formed by a plurality of spring-mounted contact pins 25 and is arranged on a flange collar 26 arranged at an "object-side" end region of the lens main body 1. In this case, said signal interface 24 is configured and provided for reversible, i.e., repeatedly producible and releasable, (electrical) coupling to a mating interface 28. In this case, said mating interface 28 is arranged on an outer housing 30 for the lens main body 1 (cf. FIG. 4) in a manner corresponding to the signal interface 24.

The outer housing 30, in the state mounted on the lens main body 1, forms together with the latter the lens 2 mentioned above and constitutes a module (separate from the lens main body 1 as discussed above). In this case, the outer housing 30 encloses the inner housing 6 in a tubular fashion, i.e., radially on the exterior, over a part of the longitudinal extent thereof. The outer housing 30 and the lens main body 1 are additionally configured and provided for reversible mounting on one another, i.e., the outer housing 30 on the lens main body 1, specifically on the inner housing 6 thereof. For this purpose, the inner housing 6 includes a securing device 32 for reversibly mounting the outer housing 30. In accordance with the exemplary embodiment shown in FIGS. 1 to 3, the securing device 32 in this case includes a part of a bayonet catch as a holding mechanism. Specifically, for this purpose, a plurality of incisions 36 are made in an image-side flange collar 34 of the lens main body 1 in a manner extending circumferentially in the circumferential direction, corresponding radially inwardly projecting projections 38 passing through said incisions during the mounting of the outer housing 30. A bayonet ring 39 is mounted downstream of the flange collar 34 on the image side, said bayonet ring being rotatable in the circumferential direction and serving for the bayonet-like locking of the projections 38 with the inner housing 6.

For the precision rotational orientation of the outer housing 30 with respect to the inner housing 6 (i.e., with regard to a rotation about the optical axis 4), the securing device 32 additionally also has a positioning aid, specifically a plurality (here: two) of fitting grooves 40 distributed over the circumference and incorporated in the object-side flange collar 26. In this case the outer housing 30 has two complementary projections 42 as corresponding positioning means, said projections intermeshing with the fitting grooves 40 of the inner housing 6 as intended.

For mounting purposes, the outer housing 30 is pushed onto the inner housing 6 from the object side—i.e. "from the front" or from the left as viewed in FIG. 1—until the radially inwardly projecting projections 38 pass through the incisions 36, and the outer housing 30 bears against the flange collars 26 and 34. For locking purposes, the bayonet ring 39 is subsequently rotated. In a variant that is not illustrated, the outer housing 30 has a mounting ring which is freely rotatable at least partly (e.g., by 45 degrees) relative to the rest of the housing body and on which the radially inwardly projecting projections 38 are arranged. Said mounting ring is subsequently rotated such that the projections 38 are rotated away from the incisions 36 and thus engage behind the flange collar 14 in a positively locking manner. Alternatively (likewise not illustrated), the entire outer housing 30 is rotated relative to the inner housing 6. In this case, the projections 42 of the outer housing 30 are pushed through the corresponding fitting grooves 40 over the flange ring 26, such that the entire outer housing 30 can be rotated in the circumferential direction for locking purposes in the manner of a bayonet catch. Furthermore, the securing device 32 includes an arrester (not illustrated in more specific detail) which is used to prevent unintentional rotation of the bayonet ring 39 or the projections 38 relative to the flange collar 34 and which can be released for demounting purposes.

In order, during intended operation on the film camera 3 (or some other camera), also to enable a signal transmission, specifically a communication (e.g., a bidirectional data exchange, reception of actuating commands to the lens element drive 9 of the focus lens element 7 and to the diaphragm drive 16) with the film camera 3, a further signal interface (also referred to as "camera interface 45") is arranged in the region of the coupling 18. Said interface is connected to the controller 20 from the technical standpoint of signal transmission.

Figures 5, 6:
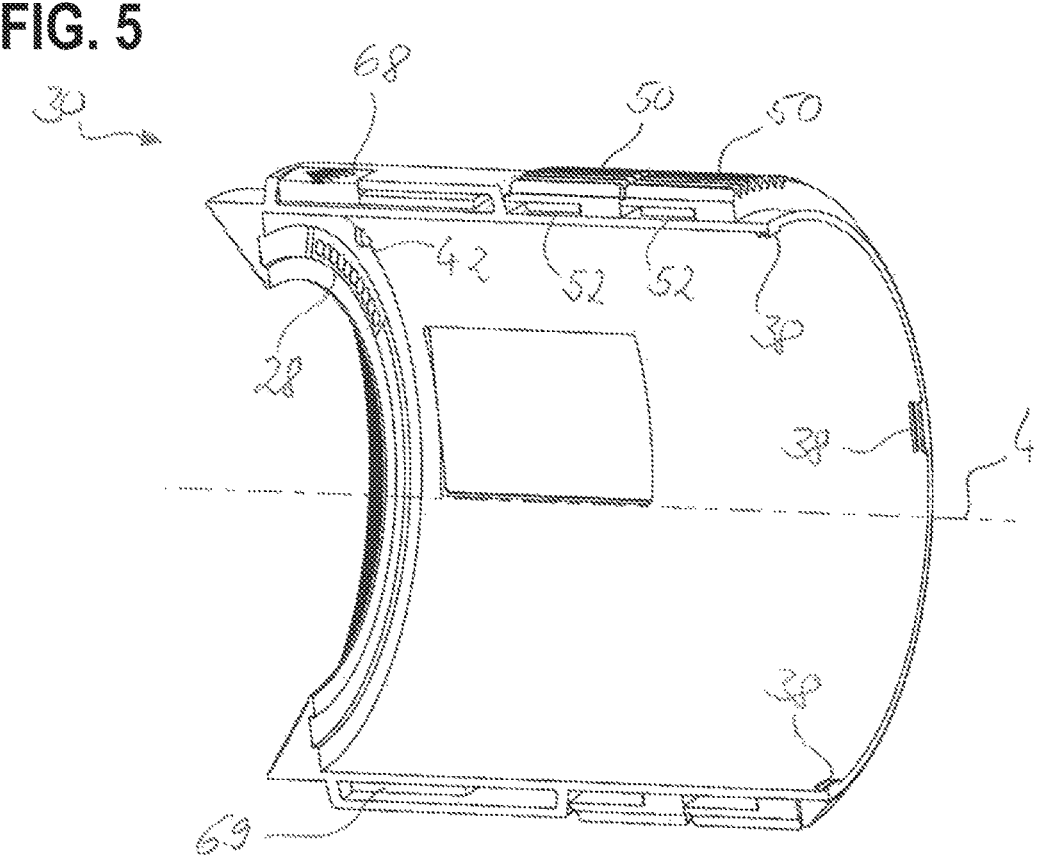
FIG. 5 shows the outer housing in accordance with FIG. 4 in a perspective sectional view along the optical axis.
FIG. 6 shows an alternative exemplary embodiment of the lens main body in a view in accordance with FIG. 3.

The lens main body 1 of the exemplary embodiment according to FIG. 6 differs from the exemplary embodiment according to FIG. 1 in terms of the embodiment of the signal interface 24 and the securing device 32. The signal interface 24 here is formed by a plurality of bending springs 44 arranged alongside one another in a comblike fashion and arranged so as to project from the image-side flange collar 34. For arresting the outer housing 30, the securing device 32 (i.e., the holding mechanism thereof) has a plurality of catch hooks (referred to as "snap-action hooks 46"; only one is illustrated in FIG. 6) which engage on the outer housing 30 on the inner side and likewise form a positively locking connection to the outer housing 30 during mounting. There is arranged on the outer housing 30, in a manner not illustrated, a knob, lever or the like which can be used to release the snap-action hooks 46 from their connection to the outer housing 30 for the purpose of demounting the outer housing 30 from the inner housing 6.

Figures 7, 8:
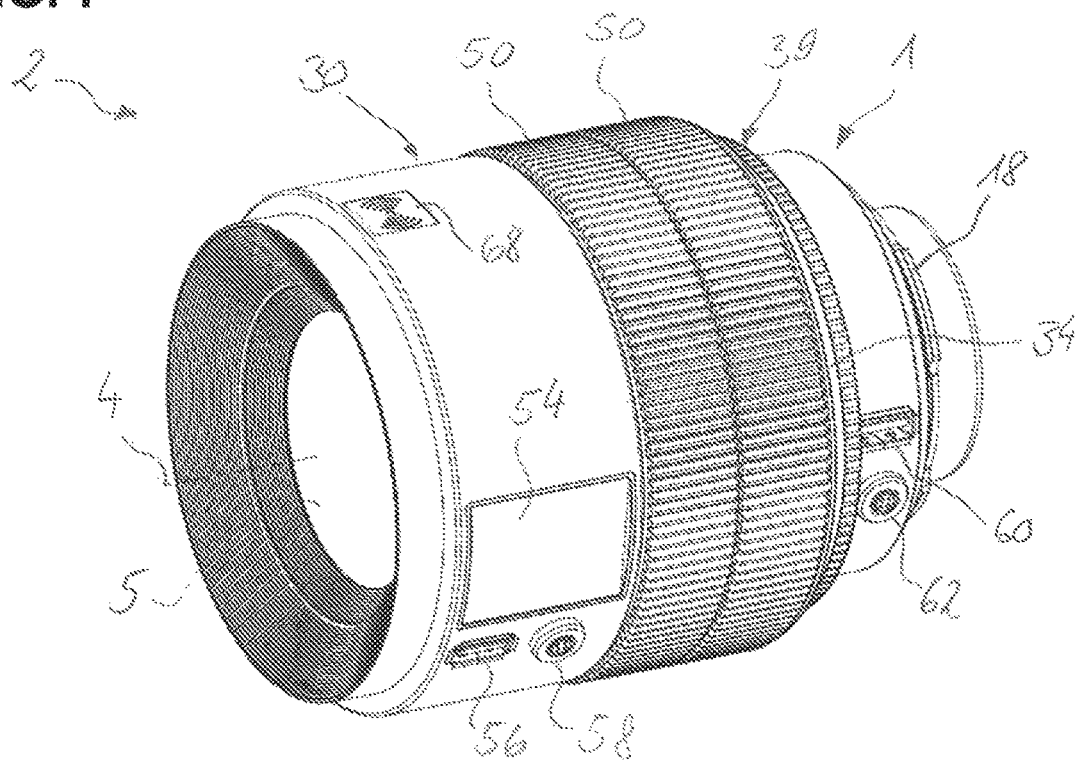
FIG. 7 shows, in a view in accordance with FIG. 6, a lens formed with the lens main body in accordance with FIG. 1 and the outer housing in accordance with FIG. 4.
FIG. 8 shows the lens in accordance with FIG. 7 in a view in accordance with FIG. 1.
Figure 9:
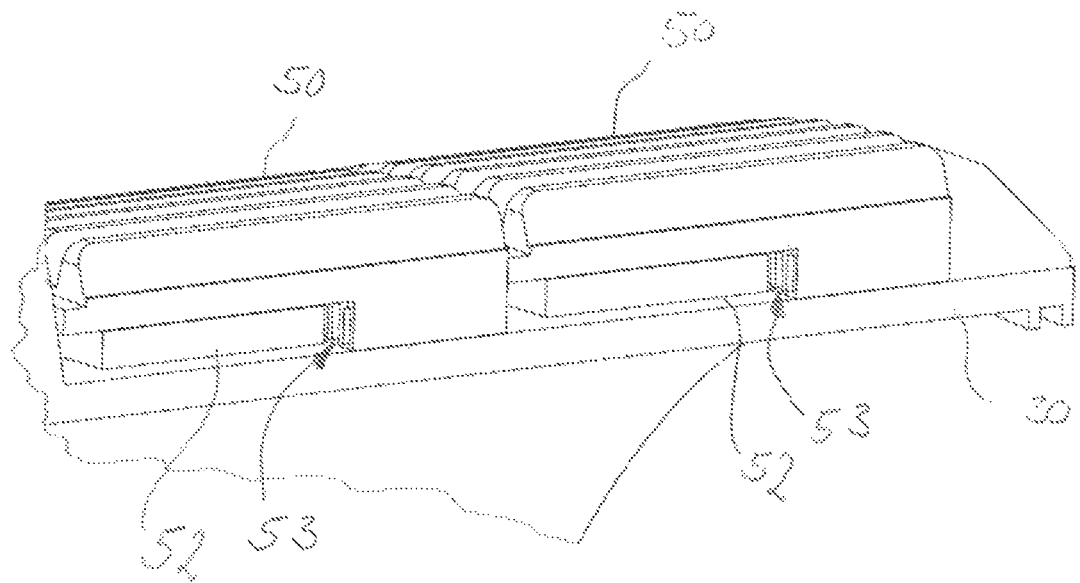
FIG. 9 shows an enlarged, perspective detail view of the outer housing in accordance with FIG. 8.

In the case of the lens 2 illustrated in FIGS. 7 and 8, the outer housing 30 mounted on the inner housing 6 has two rotary rings 50 serving respectively for adjusting the zoom lens element and the focus lens element 7. The two rotary rings 50 each have grooving applied on the exterior in the manner of toothing in order to improve the haptic effect and optionally to enable a coupling to an external actuating drive. In this case, however, the two rotary rings 50 are not mechanically coupled to the respective lens elements 5. Instead, the outer housing 30 has a respective rotary position encoder 52 (see FIGS. 5, 8 and 9) for each of the rotary rings 50, said rotary position encoder detecting a rotation of the respective rotary ring 50 by scanning a coding 53 (e.g., optical markings or fields having alternating magnetic polarity; see FIG. 9) arranged on the respective rotary ring 50 and converting said rotation into an electronic rotary position signal. By a translation unit (specifically an electronic circuit or a microcontroller) arranged on the outer housing 30, said rotary position signal is converted into the data transmission protocol used by the controller 20 and is transmitted to the signal interface 24 of the inner housing 6 via the mating interface 28. The rotary position signal is forwarded by said signal interface to the controller 20 and is used by the latter as an actuating command for adjusting the respective lens element 5. In an optional variant, one rotary ring 50 is configured and provided for adjusting the focus lens element 7, and the other rotary ring 50 for adjusting the diaphragm 14.

The outer housing 30 additionally has a display 54 for displaying information concerning current settings of the lens 2. By way of example, the currently chosen diaphragm position, the current chosen focal length (zoom setting) or distance setting and the like are displayed on the display 54 during operation of the lens 2. In this case, the corresponding items of information are communicated as one of the above-mentioned functions from the controller 20 of the lens main body 1 via the signal interface 24 to the outer housing 30, specifically to the display 54. Furthermore, as function, fault data concerning optical faults such as, e.g., aberrations and/or distortions occurring for a specific lens element position, vignetting and the like are also provided to the outer housing 30 by the controller 20. In the exemplary embodiments illustrated, the outer housing 30 specifically has two data interfaces 56 and 58, by which the outer housing 30 can communicate with an external apparatus, e.g., an image processing unit. Specifically, the outer housing 30 passes on the information described above to said apparatus. Furthermore, at least one of the data interfaces 56 and 58 also serves as a programming, service and energy supply interface to the controller 20. A different number (only one or more than two) of such data interfaces 56 and 58 is likewise possible in alternative exemplary embodiments.

The inner housing 6 also bears two data interfaces 60 and 62 (see, e.g., FIGS. 2 and 6), which are comparable to the data interfaces 56 and 58 and which serve for data exchange with the controller 20 and for the energy supply of the lens main body 1 (i.e., of the controller 20, of the lens element drives 9 and of the diaphragm drive 16). Furthermore, the inner housing 6 also has a radio module 64 having a radio antenna, said radio module serving for bidirectional data exchange with external apparatuses, as redundancy with respect to the data interfaces 56, 58, 60, and 62, or for operation with a remote control 66 (see FIG. 12), i.e., for directly receiving the radio remote control commands output by the radio remote control 66. The radio module 64 thus establishes a receiving device for receiving the remote control commands.

Figure 4:
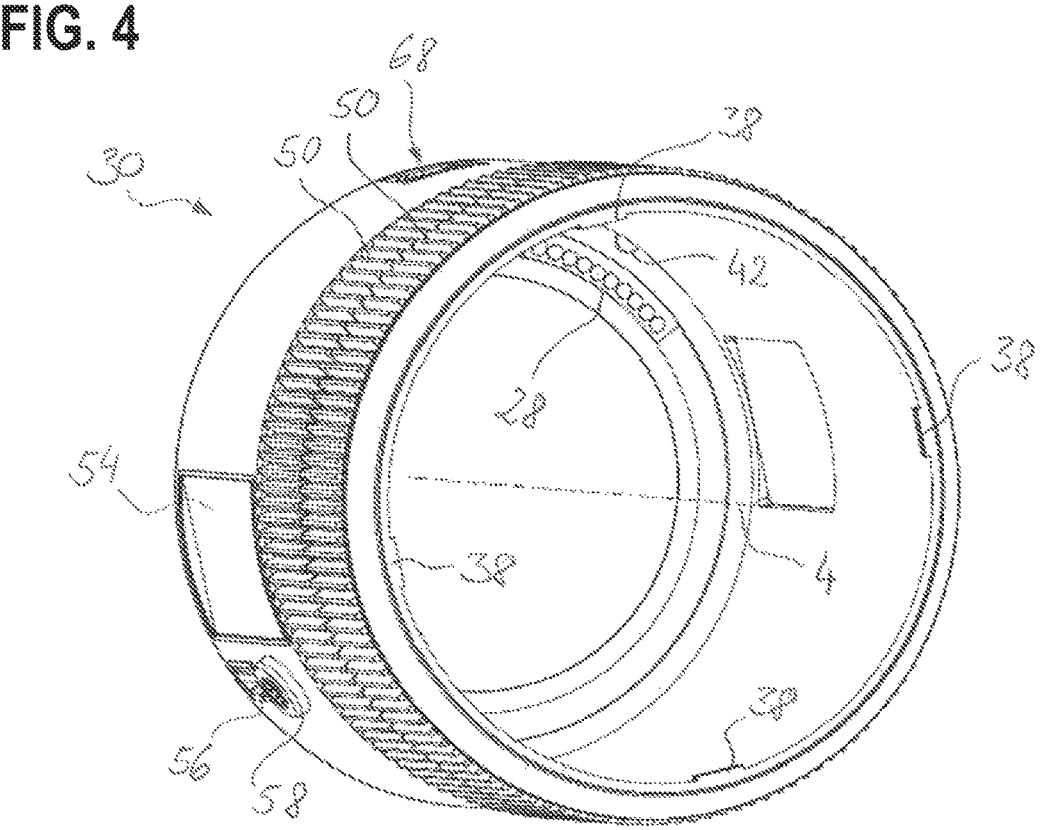
FIG. 4 shows an outer housing for the lens main body in accordance with FIG. 1 in a further perspective view.

The outer housing 30 of the exemplary embodiment shown in FIGS. 4 and 7 likewise has a radio module 68, which is comparable to the radio module 64 and which fulfils the same tasks as the radio module 64 of the lens main body 1. In an optional exemplary embodiment, one of the two radio modules 64 or 66 can be omitted.

Moreover, the outer housing 30 has an identification unit 69 (formed by an electronic circuit). The lens main body 1 also has a comparable identification unit integrated into the controller. These identification units 69 are configured to transmit identification data respectively related to the lens main body 1 and the outer housing 30, e.g., serial numbers, focal length range of the lens main body 1, functional scope of the outer housing 30, etc. As a result, by way of example, the controller 20 can prevent a communication of lens settings if the outer housing 30—as in FIG. 10—does not have a display 54. Moreover, it is thereby possible for the outer housing 30 also to be used for a plurality of different lens main bodies 1, which, however, are identical in terms of dimensions.

Alternatively, the identification units 69 are configured to choose from a plurality of communicated items of information only the items of information which are to be assigned to the respective functions that are utilizable by the outer housing 30. By way of example, an outer housing 30 without a display 54 will ignore the information communicated for purely being displayed. As a result, a mutual "registration"—also referred to as "handshake"—can be obviated.

Figure 10:
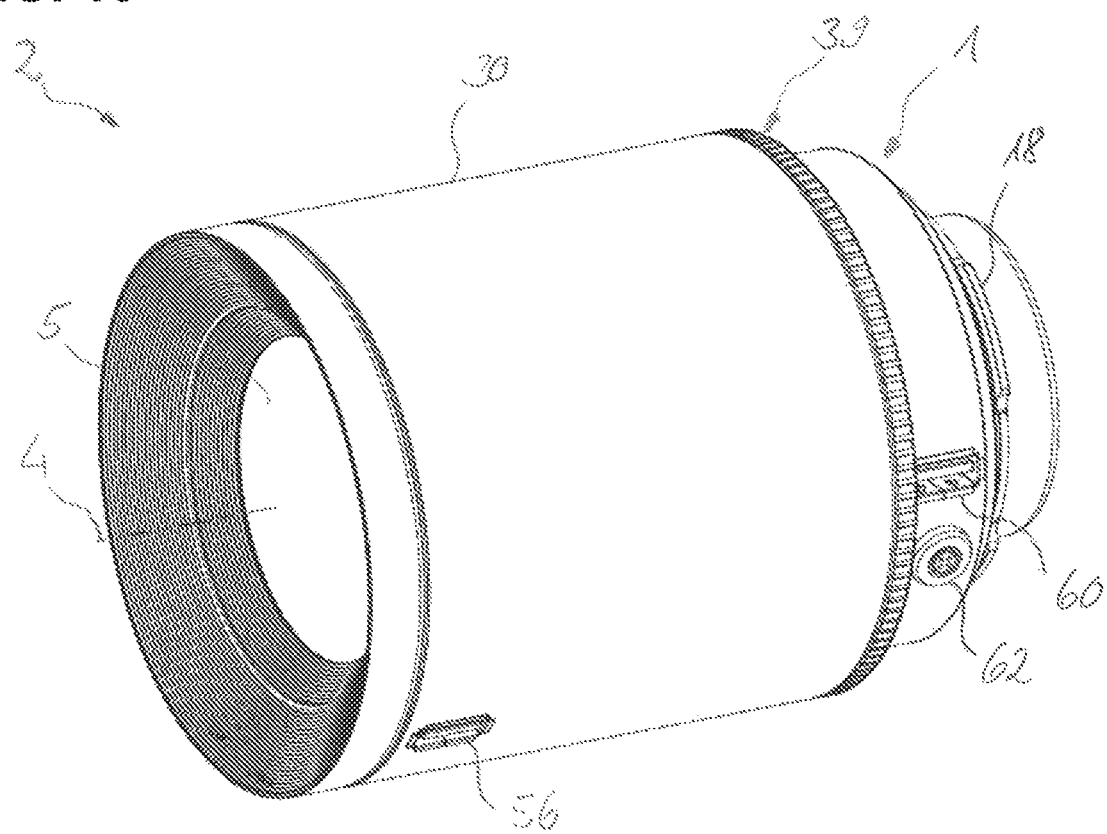
FIG. 10 shows a lens of an alternative exemplary embodiment of the outer housing in a view in accordance with FIG. 3.

In the context of the lens 2 shown in FIG. 10, the outer housing 30 mounted on the inner housing 6 is a remote control housing. The latter has no rotary rings 50, no display 54 and only the data interface 56. In this case, the data interface 56 is configured for coupling to an external radio module of a radio remote control (e.g., the remote control 66). Said external radio module serves for wirelessly receiving radio remote control commands and for forwarding them to an external actuating drive for lenses. In this case, however, the respective radio remote control command is transmitted from the radio module via the data interface 56—and a translation unit for converting the radio remote control command into the data transmission protocol of the controller 20, said translation unit optionally being arranged on the outer housing 30—to the controller 20. The lens elements 5 are thus adjusted by the lens element drives 9 in remote control operation as well. In an optional variant, the signal transmission to the controller 20 is effected wirelessly via the (internal) radio module 64 arranged on the inner housing 6.

Figure 11:
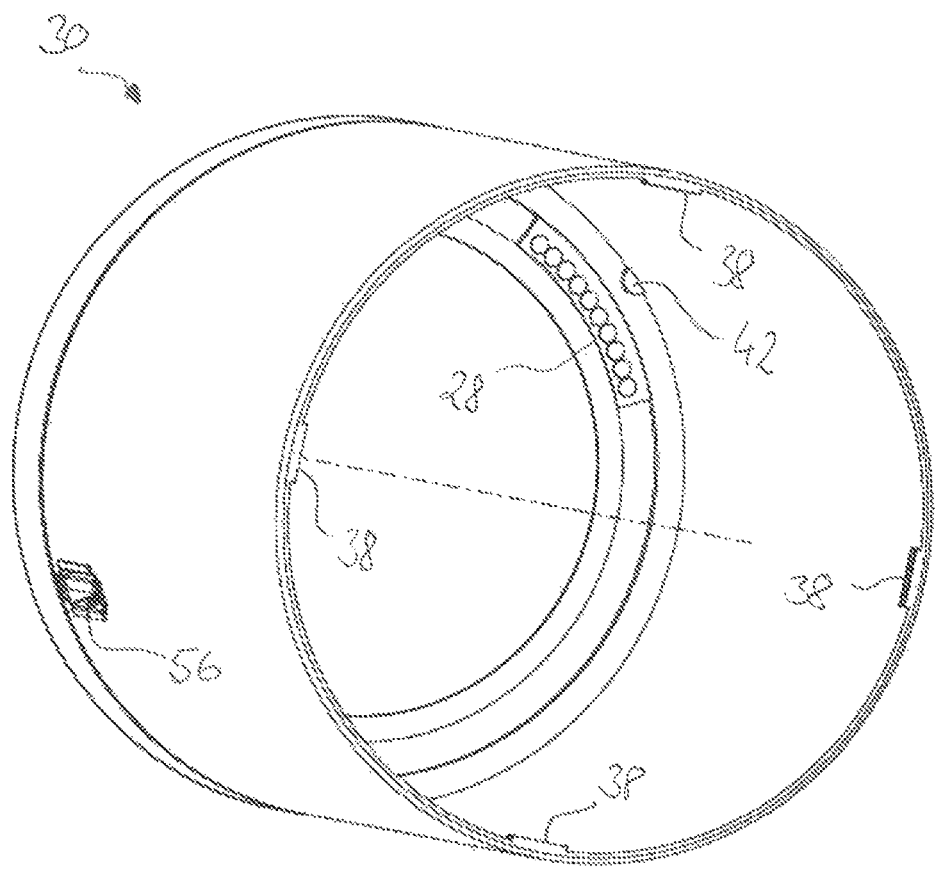
FIG. 11 shows an alternative exemplary embodiment of the outer housing in a view in accordance with FIG. 4.

In a further exemplary embodiment (not illustrated), the outer housing 30 in accordance with FIGS. 10 and 11 also has the radio module 68 in order to directly receive the radio remote control commands output by the radio remote control. In this case, the data interface 56 serves as redundancy and as programming and energy supply interface.

FIG. 12 schematically shows the lens 2 on the film camera 3 in remote control operation by the remote control 66. In this case, the outer housing 30 corresponds to the exemplary embodiment shown in FIG. 4. To save weight, however, in a further exemplary embodiment, the outer housing 30 of the exemplary embodiment shown in FIG. 11 can also be used.

Figure 13:
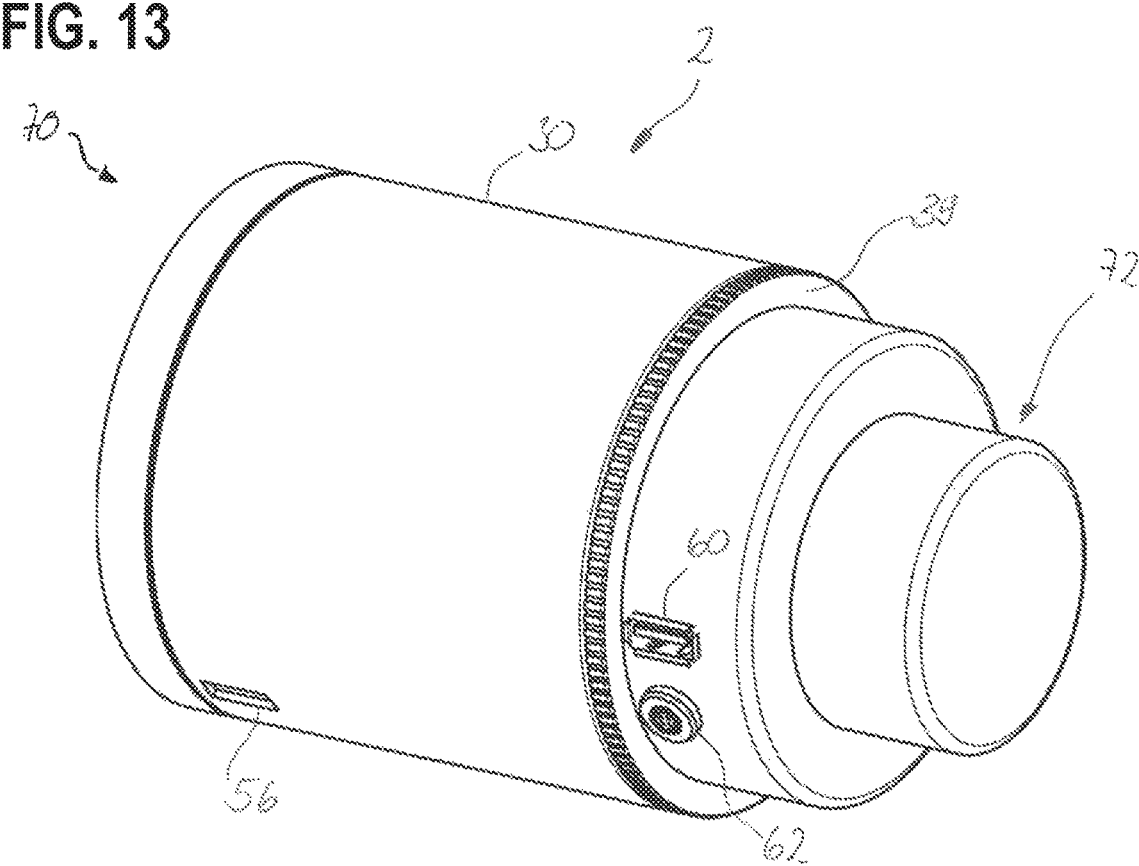
FIGS. 13 and 14 show, in a perspective view and in a perspective sectional view, a camera module including the lens main body and the outer housing in accordance with FIG. 10.
Figure 14:
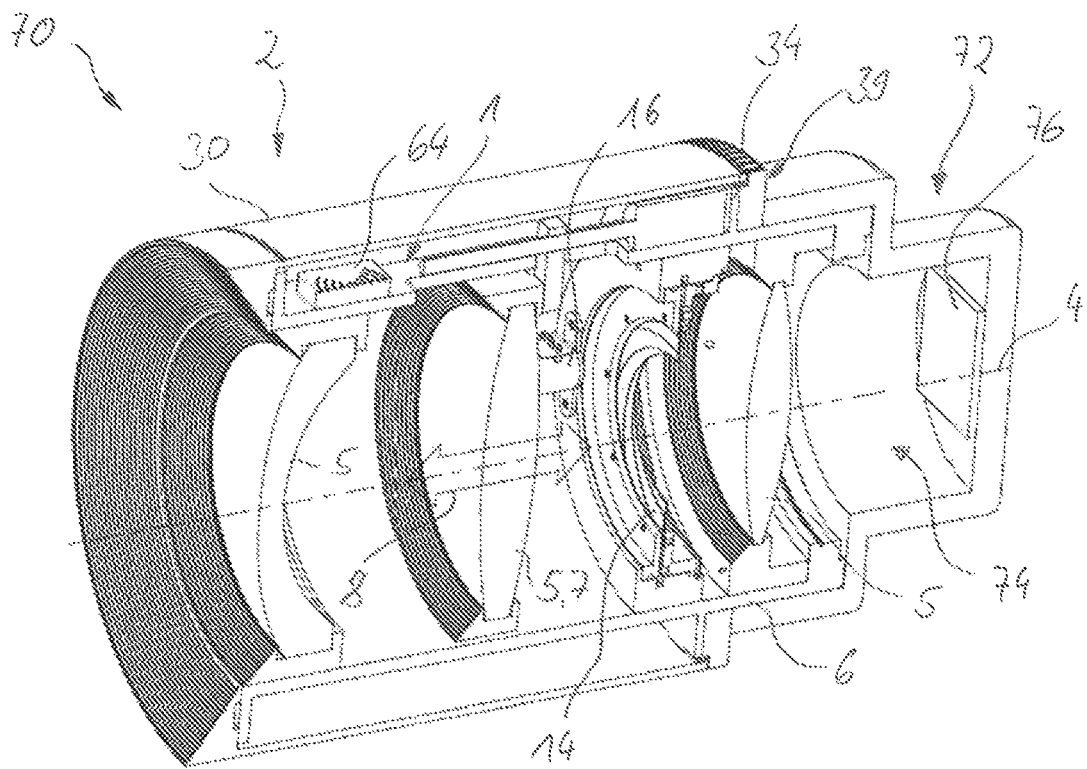

FIGS. 13 and 14 show a camera module 70 formed with the lens 2 of the exemplary embodiment shown in FIG. 10. In this case, a housing termination (or: "housing cap 72") (assigned to the outer housing 30) is attached to the lens 2 on the image side and forms an image-side housing chamber 74. An image sensor 76 is arranged on the housing cap 72 on the inner side, by which image sensor images that are imaged by the lens elements 5 are detectable.

In summary, a lens main body 1 for a lens 2 is provided, including an inner housing 6, at least one adjustable functional element 7 and 14 mounted adjustably on the inner housing 6, a controller 20 arranged on the inner housing 6, a securing device 32 configured for reversibly receiving an outer housing 30 extending around the inner housing 6 in a tubular fashion, and a first signal interface 24 for receiving and/or transmitting signals for or from the controller 20, said first signal interface being arranged on the inner housing 6, wherein the first signal interface 24 is configured for reversibly coupling to a mating interface 28 of the outer housing 30, wherein the controller 20 has a first number of functions.

According to an exemplary embodiment, the lens main body 1 includes at least one drive 9 and 16 arranged on the inner housing 6 and serves for adjusting the functional element 7 and 14 or at least one of the optional plurality of functional elements 7 and 14.

According to an exemplary embodiment, the functional element or at least one of the optional plurality of functional elements is formed in each case by an element chosen from the group of: a lens element 7, a diaphragm 14, a filter, and/or an optical freeform element.

According to an exemplary embodiment, the inner housing 6 encapsulates the respective functional element 5, 7, and 14 against contamination.

According to an exemplary embodiment, the securing device 32 includes a toolless holding mechanism.

According to an exemplary embodiment, the securing device 32 includes a positioning aid 40 for the rotational orientation of the outer housing 30 relative to the inner housing 6.

According to an exemplary embodiment, the positioning aid 40 is configured to predefine a mounting of the outer housing 30 in a first or at least one second predefined orientation, and comprising a second signal interface 24, which is arranged on the inner housing 6 and by which the mating interface 28 of the outer housing 30 arranged in the second predefined orientation is coupled.

According to an exemplary embodiment, the first signal interface 24 is embodied as a continuously variable interface, by which the mating interface 28 of the outer housing 30 is couplable in an arbitrary rotational orientation of the outer housing 30 relative to the inner housing 6.

According to an exemplary embodiment, the controller 20 is configured to output a position variable that is characteristic of an actuating position of the or the respective functional element 7 and 14 as a function.

According to an exemplary embodiment, the controller 20 is configured to output and/or to receive identification data as function.

According to an exemplary embodiment that the controller 20 is configured to output actuating-position-related lens element data as a function.

According to an exemplary embodiment, the first and the optionally present second signal interface 24 include electrical contacts.

According to an exemplary embodiment, the first and the optionally present second signal interface 24 are configured for the energy supply of the outer housing 30.

According to an exemplary embodiment, the lens main body 1 includes a radio receiver 64 for receiving remote control commands wirelessly transmitted separately from the outer housing 30, said radio receiver being embodied in addition to the first and the optionally second signal interface 24.

According to an exemplary embodiment, the controller 20 is configured to exchange dimensionless and/or dimensional information optionally in different unit systems, typically in the metric or Anglo-American unit system, as a function.

According to an exemplary embodiment, the lens main body 1 includes a camera interface 45 for communication with and/or for receiving energy from a camera 3 on which the lens (2) is mounted in the intended operating state.

According to an exemplary embodiment, the lens main body 1 includes an energy supply connection 60 and 62 for receiving energy for the operation of the drive 9 and 16 and/or of the controller 20 from an external energy supply unit.

According to an exemplary embodiment, the lens main body 1 includes a data interface 60 and 62 for data exchange with an external apparatus.

In addition, an outer housing 30 for a lens main body 1 includes securing means 38 configured for reversible securing to the inner housing 6 of the lens main body 1.

According to an exemplary embodiment, the outer housing 30 includes at least one rotary ring 50 for adjusting the functional element 7 and 14 or at least one of the optional plurality of functional elements 7 and 14, wherein the rotary ring 50 is coupled to a rotary position encoder 52, and wherein the rotary position encoder 52 is configured for generating an actuating command for output to the controller 20 arranged on the inner housing 6 of the lens main body 1.

According to an exemplary embodiment, the outer housing 30 includes at least one display 54 for displaying information about the lens 2 formed together with the lens main body 1.

According to an exemplary embodiment, the display 54 is configured for displaying the position variable that is characteristic of the actuating position of the functional element 7 and 14 or at least one of the optional plurality of functional elements 7 and 14.

According to an exemplary embodiment, the outer housing 30 includes a receiving device 68 for receiving remote control commands and comprising a communicating device for communicating the remote control commands to the mating interface 28.

According to an exemplary embodiment, the outer housing 30 includes a data interface 56 and 58 for data exchange with an external apparatus.

According to an exemplary embodiment, the outer housing 30 includes an identification unit 69 for identifying the currently connected lens main body 1 by the identification data transmitted by the controller 20.

According to an exemplary embodiment, the identification unit 69 is configured to process, from a plurality of items of information provided on the part of the controller 20 of the currently connected lens main body 1, only a number of items of information corresponding to a functional scope of the outer housing 30.

According to an exemplary embodiment, the outer housing 30 includes a housing termination 72 embodied on the image side with respect to the lens main body 1, and an image sensor 76 arranged in the housing termination 72.

According to an exemplary embodiment, the first and the optionally present second mating interface 24 are configured for transmitting energy to the first and respectively second signal interface 24 of the lens main body 1.

In addition, a lens 2 includes a lens main body 1, an outer housing 30, which is reversibly connectable or connected to the inner housing 6 of the lens main body 1, and wherein the outer housing 30 is configured for the utilization of a second number of functions altered vis-à-vis the first number of the functions provided by the controller 20.

Further, a lens assembly includes a lens main body 1 and a first and a second outer housing 30, wherein each of the two outer housings 30 is configured in each case for the utilization of a different number of the functions provided by the controller 20.

The subject matter of the disclosure is not restricted to the exemplary embodiments described above. Rather, further embodiments of the disclosure can be derived from the above description by the person skilled in the art. In particular, the individual features of the disclosure, and the configuration variants thereof, as described with reference to the various exemplary embodiments, can also be combined with one another in some other way.

LIST OF REFERENCE NUMERALS

1 Lens main body
2 Lens
3 Film camera
4 Optical axis
5 Lens element
6 Inner housing
7 Focus lens element
8 Double-headed arrow
9 Lens element drive
10 Electric motor
11 Spindle drive
14 Diaphragm
16 Diaphragm drive
18 Coupling
20 Controller
21 Printed circuit board
24 Signal interface
25 Contact pin
26 Flange collar
28 Mating interface
30 Outer housing
32 Securing device
34 Flange collar
36 Incision
38 Projection
39 Bayonet ring
40 Fitting groove
42 Projection
44 Bending springs
46 Snap-action hooks
50 Rotary ring
52 Rotary position encoder
53 Coding
54 Display
56 Data interface
58 Data interface
60 Data interface
62 Data interface
64 Radio module
66 Remote control
68 Radio module
69 Identification unit
70 Camera module
72 Housing cap
72 Housing chamber
76 Image sensor

What is claimed is:

1. A lens main body for a lens, the lens main body comprising:
an inner housing;
the inner housing including a mating interface configured to reversibly receive an outer housing;
at least one adjustable functional element mounted adjustably on the inner housing;
a controller arranged on the inner housing and having a function;
a securing device configured to reversibly receive the outer housing, and
a signal interface arranged on the inner housing and configured to receive and/or transmit signals to or from the controller, and
wherein the securing device includes a toolless holding mechanism and a positioning aid for a rotational orientation of the outer housing relative to the inner housing.

2. The lens main body according to claim 1, further comprising:
at least one drive arranged on the inner housing and configured to adjust the at least one adjustable functional element, and
wherein the at least one adjustable functional element is a lens element, a diaphragm, a filter, and/or an optical freeform element.

3. The lens main body according to claim 2, further comprising:
an energy supply connection configured to receive energy from an external energy supply to operate the drive and/or of the controller.

4. The lens main body according to claim 1, wherein the inner housing encapsulates the at least one adjustable functional element against contamination.

5. The lens main body according to claim 1, wherein:
the positioning aid is configured to predefine a mounting of the outer housing in a first predefined orientation or in at least one second predefined orientation, and
the lens main body further comprises a second signal interface arranged on the inner housing by which the mating interface of the outer housing arranged in the second predefined orientation is coupled.

6. The lens main body according to claim 1, wherein the first signal interface is a continuously variable interface by which the mating interface of the outer housing is couplable in an arbitrary rotational orientation of the outer housing relative to the inner housing.

7. The lens main body according to claim 1, wherein the controller is configured to:
output a position variable that is characteristic of an actuating position of the at least one adjustable functional element as the function,
output and/or receive identification data as the function, and
output actuating-position-related lens element data as the function.

8. The lens main body according to claim 1, wherein:
the signal interface is a first signal interface,
the lens main body further includes a second signal interface,
each of the first and second signal interfaces include electrical contacts, and
the first and second signal interfaces are configured to supply energy to the outer housing.

9. The lens main body according to claim 8, further comprising:
a radio receiver configured to wirelessly receive remote control commands independent from the outer housing.

10. The lens main body according to claim 1, wherein the controller is configured to exchange dimensionless and/or dimensional information in different unit systems as the function.

11. The lens main body according to claim 1, further comprising:
a camera interface configured to communicate with a camera and/or to receive energy from the camera on which the lens is mounted in an operating state.

12. The lens main body according to claim 1, further comprising a data interface to exchange data with an external apparatus.

13. An outer housing for a lens main body, the outer housing comprising:
a securing device configured to reversibly secure the outer housing to an inner housing of the lens main body, the outer housing extending around the inner housing in a tubular fashion, wherein the securing device includes a toolless holding mechanism and a positioning aid for a rotational orientation of the outer housing relative to the inner housing.

14. The outer housing according to claim 13, further comprising:
at least one rotary ring configured to adjust the at least one adjustable functional element,
wherein the rotary ring is coupled to a rotary position encoder, and
wherein the rotary position encoder is configured to generate an actuating command to be outputted to a controller arranged on the inner housing of the lens main body.

15. The outer housing according to claim 13, further comprising:
at least one display configured to display information about the lens which is formed together with the lens main body and a position variable that is characteristic of an actuating position of at least one adjustable functional element of the lens main body.

16. The outer housing according to claim 13, further comprising:
a mating interface;
a receiver configured to receive remote control commands;
a communicating device configured to communicate the remote control commands to the mating interface; and
a data interface configured to exchange data with an external apparatus.

17. The outer housing according to claim 16, wherein the mating interface is a first mating interface,
wherein the outer housing further comprises a second mating interface, and
wherein the first and second mating interfaces are configured to transmit energy to a first signal interface and a second signal interface of the lens main body.

18. The outer housing according to claim 13, further comprising:
an identification unit configured to:
identify a currently connected lens main body by identification data transmitted by a controller arranged on the inner housing, and
process, from a plurality of items of information provided by the controller about the currently connected lens main body, only a subset of information corresponding to a functional scope of the outer housing.

19. The outer housing according to claim 13, further comprising:
a housing termination on an image side with respect to the lens main body, and
an image sensor arranged in the housing termination.

20. A lens, comprising:
a lens main body; and
an outer housing;
the lens main body comprising:
an inner housing;
the inner housing including a mating interface configured to reversibly receive an outer housing;
at least one adjustable functional element mounted adjustably on the inner housing;
a controller arranged on the inner housing and having a function;
a securing device configured to reversibly receive the outer housing, and
a signal interface arranged on the inner housing and configured to receive and/or transmit signals to or from the controller; and
the outer housing comprising:
a securing device configured to reversibly secure the outer housing to an inner housing of the lens main body, the outer housing extending around the inner housing in a tubular fashion, wherein the securing device includes a toolless holding mechanism and a positioning aid for a rotational orientation of the outer housing relative to the inner housing.

\* \* \* \* \*